(12) United States Patent
Cai et al.

(10) Patent No.: US 8,146,423 B2
(45) Date of Patent: Apr. 3, 2012

(54) ION DISCHARGE GYROSCOPE

(75) Inventors: Yongyao Cai, Acton, MA (US); Yang Zhao, Andover, MA (US)

(73) Assignee: MEMSIC, Inc., Andover, MA (US)

( * ) Notice: Subject to any disclaimer, the term of this patent is extended or adjusted under 35 U.S.C. 154(b) by 87 days.

(21) Appl. No.: 12/778,258

(22) Filed: May 12, 2010

(65) Prior Publication Data

US 2011/0005314 A1 Jan. 13, 2011

Related U.S. Application Data

(60) Provisional application No. 61/223,457, filed on Jul. 7, 2009.

(51) Int. Cl.
*G01P 9/00* (2012.01)

(52) U.S. Cl. .................................... 73/504.05

(58) Field of Classification Search ............... 73/504.05
See application file for complete search history.

(56) References Cited

U.S. PATENT DOCUMENTS

| | | | | |
|---|---|---|---|---|
| 1,841,607 | A | * | 1/1932 | Kollsman ........................ 73/180 |
| 2,999,389 | A | | 9/1961 | Granqvist |
| 3,160,018 | A | | 12/1964 | Johnston |
| 3,218,871 | A | | 11/1965 | Dressler et al. |
| 3,910,122 | A | | 10/1975 | Evans et al. |
| 3,965,753 | A | * | 6/1976 | Browning, Jr. .............. 73/504.18 |
| 4,393,707 | A | | 7/1983 | Ferrar |
| 4,941,353 | A | * | 7/1990 | Fukatsu et al. .............. 73/504.05 |
| 5,012,676 | A | * | 5/1991 | Takahashi et al. .............. 73/497 |
| 6,127,775 | A | * | 10/2000 | Bergen ........................ 313/422 |
| 2002/0176087 | A1 | | 11/2002 | Numai |
| 2004/0211257 | A1 | * | 10/2004 | Geen .......................... 73/504.04 |

FOREIGN PATENT DOCUMENTS

| | | | |
|---|---|---|---|
| JP | 60-133369 | * | 7/1985 |
| JP | 60133369 | | 7/1985 |

OTHER PUBLICATIONS

"Micromechanical Thermo-Fluidic Single-Axis Yaw Rate Sensor", Gianluca Piazza et al., University of California Berkeley.
"Simulation and Fabrication of a Convective Gyroscope", Van Thanh Dau et al., IEEE Sensors Journal, vol. 8, No. 9., Sep. 2008.

* cited by examiner

Primary Examiner — Hezron E Williams
Assistant Examiner — Gregory J Redmann
(74) Attorney, Agent, or Firm — Weingarten, Schurgin, Gagnebin & Lebovici LLP

(57) ABSTRACT

An ion discharge gyroscope measures rotational motion and linear acceleration by generating symmetrical ion jet streams and measuring respective amounts of the jet streams impinging on detectors located so as to intercept the ion jet streams. The ion jet streams will be diverted by operation of the Coriolis effect and the differences in the amount of each ion jet stream impinging on the detectors is an indication of rotational motion and linear acceleration. In one embodiment, the ion jet streams are heated and the respective temperatures of the detectors are measured. In another embodiment, the amounts of current flowing through each detector, as contributed by the ion jet streams, are measured and used to determine rotation and acceleration.

21 Claims, 18 Drawing Sheets

ION DISCHARGE GYROSCOPE

CROSS REFERENCE TO RELATED APPLICATION

Priority of U.S. Provisional Patent Application Ser. No. 61/223,457 for "Ion Gyroscope," filed Jul. 7, 2009, is claimed.

STATEMENT REGARDING FEDERALLY SPONSORED RESEARCH OR DEVELOPMENT

N/A

BACKGROUND OF THE INVENTION

A gyroscope is a sensing device that detects rotational motion, i.e., angular velocity. Typical applications include, for example, navigation devices, camera image stabilization mechanisms and gaming equipment. There are different types of gyroscopes including optical (fiber gyro), flying wheel and MEMS (micro-electrical-mechanical-system).

In the consumer electronics market for mobile phones, GPS devices, etc., small size, low cost and robustness are critical to mass deployment. Currently, the MEMS-based gyroscope is gradually finding its way to this market. These gyroscopes are based on the Coriolis acceleration which is proportional to the velocity $\vec{V}$ of a vibrating structure and the external rotation rate $\vec{\Omega}$ such that the Coriolis acceleration $\vec{a} = 2\vec{\Omega} \times \vec{V}$.

A known MEMS-based vibration-mode gyroscope uses a beam structure and a capacitive sensing mechanism. This approach, however, is subject to inaccuracy induced by mechanical shock and suffers from other reliability issues. In addition, such sensors require a complicated MEMS manufacturing process and a relatively large sensing area. As would be expected, therefore, the manufacturing costs are higher when compared to other MEMS-based devices, such as an accelerometer, a microphone, etc. These issues have prevented a MEMS-based gyroscope from being widely deployed in consumer electronics.

A convective gyroscope is known and its design involves a micro pump that generates a hot fluid jet stream. This hot jet stream will change its direction in the presence of rotational motion. The micro pump is typically actuated by a piezoelectric lead zirconate titanate (PZT) diaphragm but is difficult to manufacture in a MEMS process.

What is needed is a MEMS-based gyroscope that is accurate, has high reliability and that is economical to manufacture.

BRIEF SUMMARY OF THE INVENTION

An ion discharge gyroscope provides accurate measurement of rotational motion and linear acceleration by generating symmetrical ion jet streams and measuring respective amounts of the jet streams impinging on detectors located to intercept the respective ion jet streams. The ion jet streams will be diverted by operation of the Coriolis effect and the differences in the amount of each ion jet stream impinging on the detectors is an indication of rotational motion and linear acceleration. In one embodiment, the ion jet streams are heated and the respective temperatures of the detectors are measured. In another embodiment, the amounts of current flowing through each detector, as contributed by the ion jet stream, are measured and used to determine rotation and acceleration.

BRIEF DESCRIPTION OF THE SEVERAL VIEWS OF THE DRAWINGS

Various aspects of at least one embodiment of the present invention are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. These figures are provided for the purposes of illustration and explanation and are not intended as a definition of the limits of the invention. In the figures.

DETAILED DESCRIPTION OF THE INVENTION

U.S. Provisional Patent Application Ser. No. 61/223,457 for "Ion Gyroscope," filed Jul. 7, 2009, is incorporated by reference herein in its entirety and for all purposes.

One or more embodiments of the present invention are directed to an ion discharge gyroscope that provides accurate measurement of rotational motion in addition to being robust enough to withstand the forces of most consumer product implementations and in a structure that is relatively easy to manufacture.

Figure 1:
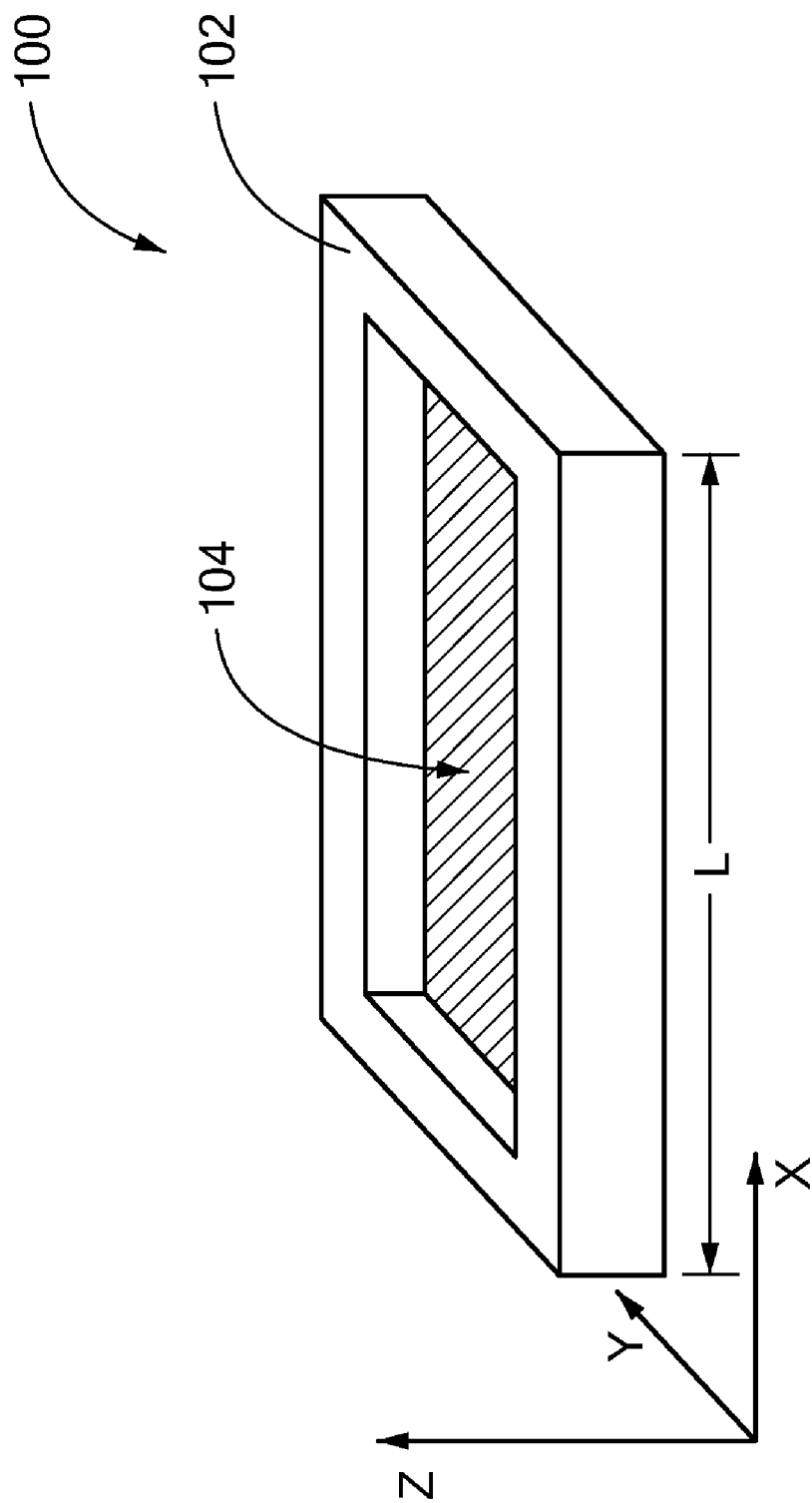
FIG. 1 is a representation of an orientation and general shape of the sensors described herein.

As an overview, and referring now to FIG. 1, a sensor 100, embodiments of which will be described in more detail below, is generally formed on a rectangular substrate 102 fabricated out of silicon or other similar material. Typically, the substrate is on the order of 1-2 mm on a side. A cavity 104 is etched in the substrate 102 in order to provide a working space for the gyroscope movement. Generally, a longitudinal direction L will be defined and referenced throughout the present specification with the longitudinal direction L aligned with an X axis that is co-planar and perpendicular to a Y axis.

For ease of explanation below, a Z axis is defined as being orthogonal to the plane defined by the X, Y axes.

Figure 2A:
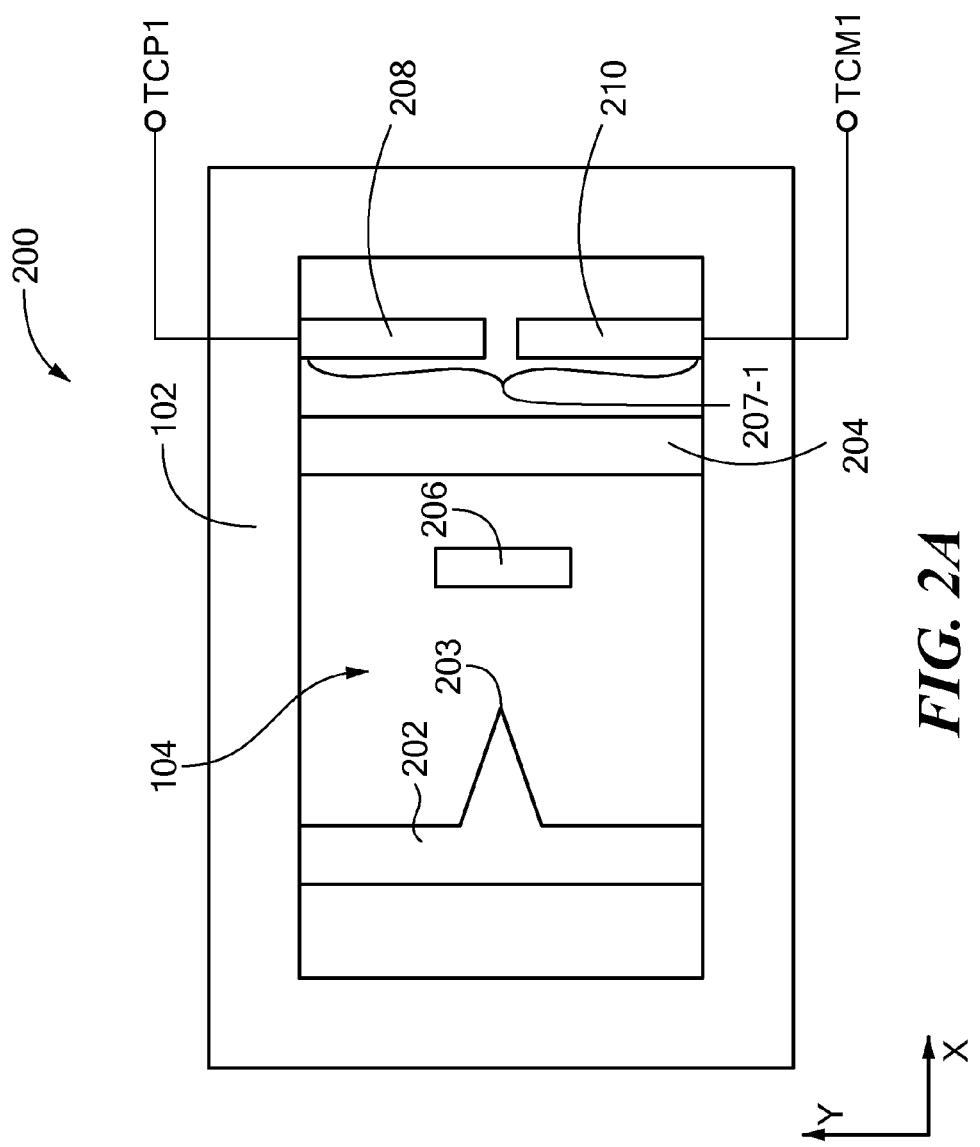
FIGS. 2A-2C are schematic representations of an ion gyroscope according to one embodiment of the present invention.
Figure 2B:
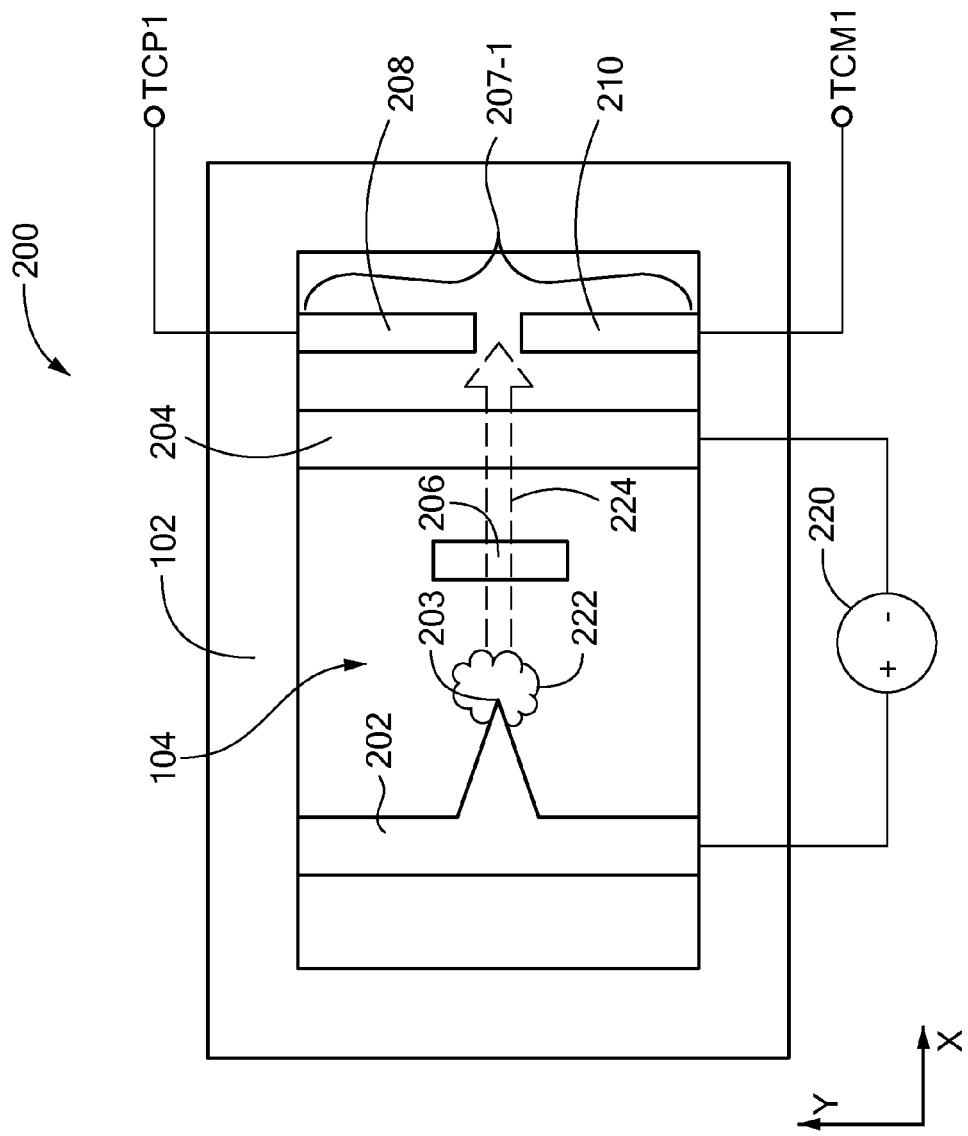
Figure 2C:
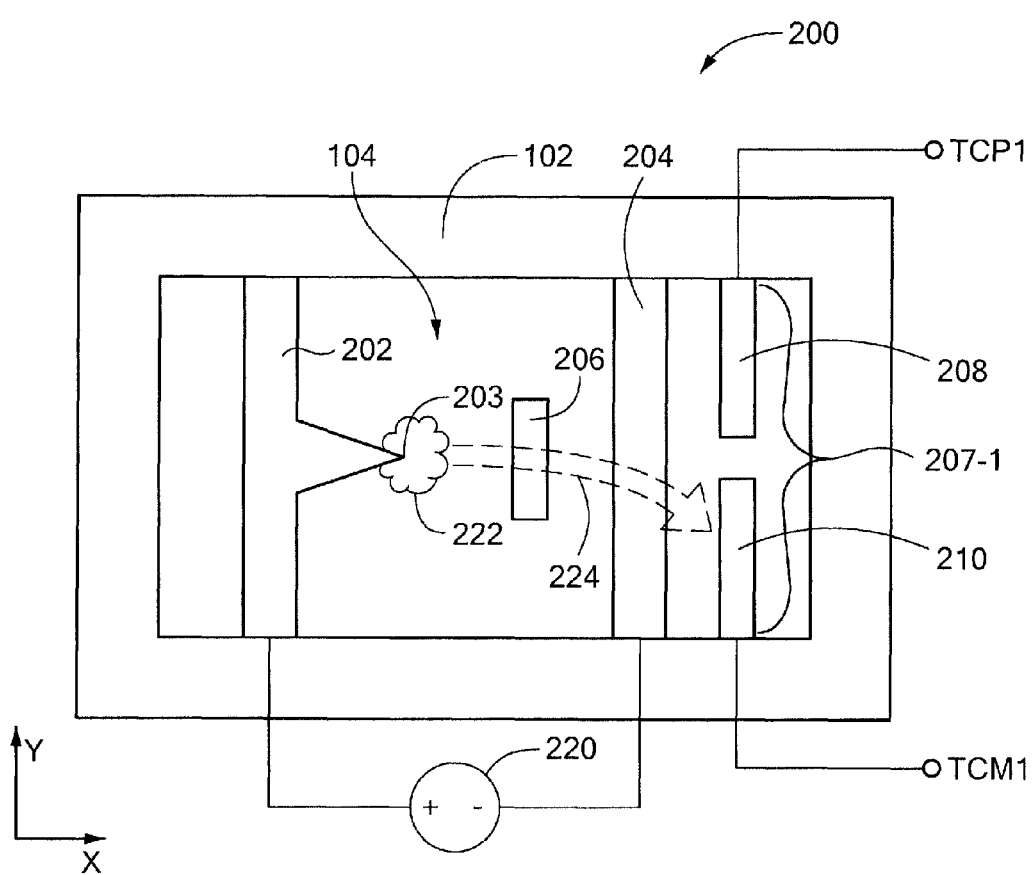
Figure 4:
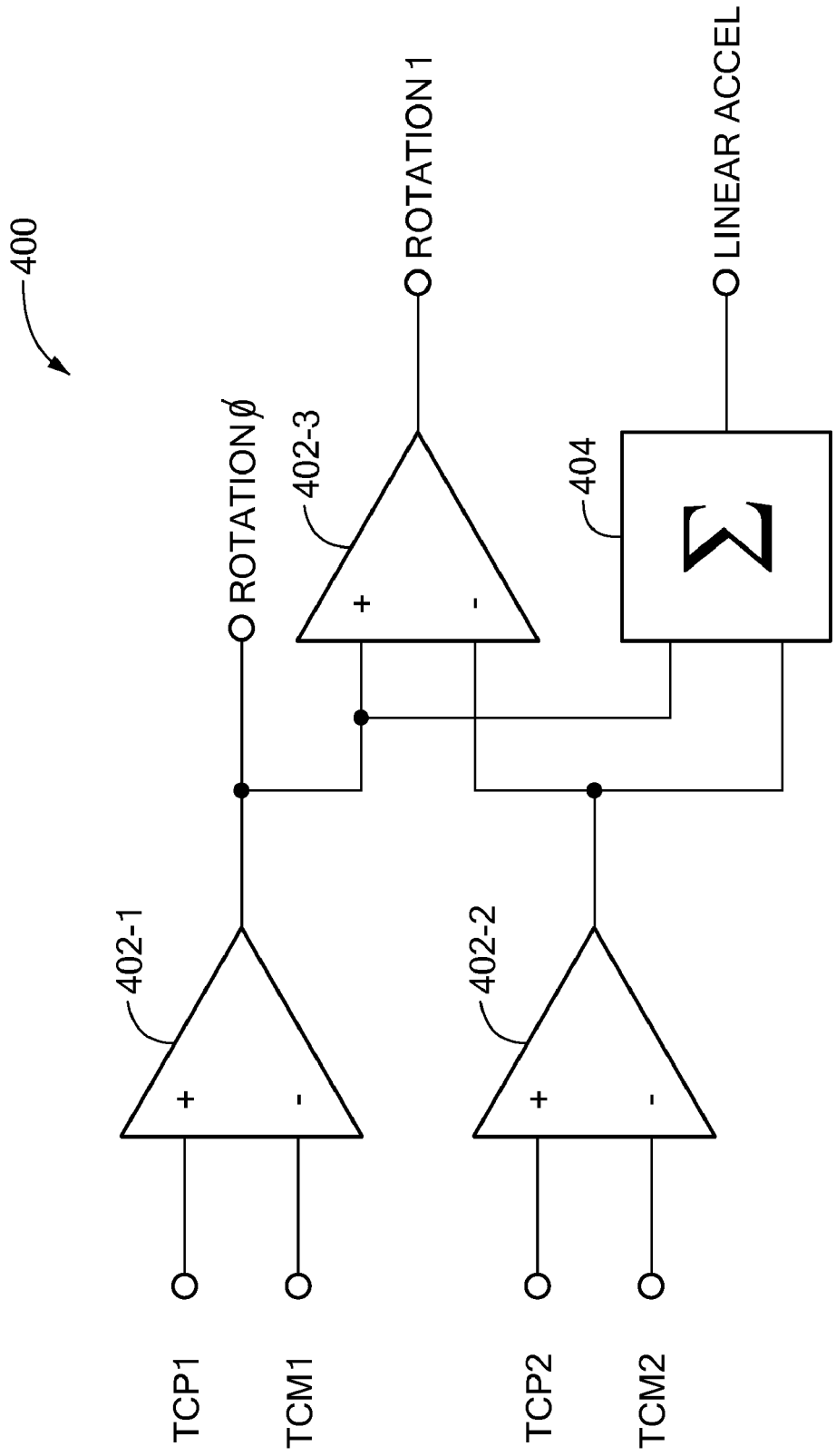
FIG. 4 is a measurement circuit for use with either of the first and second embodiments of the present invention shown in FIGS. 2 and 3.

In one embodiment of an ion gyroscope 200, as shown in FIGS. 2A-2C, a substrate 102 is provided with a cavity 104 within which is disposed an anode 202 having a sharp anode tip 203. Alternatively, there may be more than one sharp anode tip provided on the anode, however, a single anode tip makes it easier to ionize a gas as will be discussed below. A cathode 204 is disposed in the cavity 104 and opposite the sharp tip 203. A first set 207-1 of thermocouples including a positive thermocouple (TCP) 208 and a negative thermocouple (TCM) 210 are provided within the cavity 104 and arranged such that, generally, the cathode 204 is disposed between the anode 202 and the positive and negative thermocouples 208, 210. A heater 206 is provided in the cavity 104 between the anode and cathode. The positive thermocouple 208 has a corresponding output TCP1 and the negative thermocouple 210 has a corresponding output TCM1 that are, respectively, coupled to the inputs of a differentiated amplified 402-1, as shown in FIG. 4.

A gas, for example, Nitrogen, Neon or Argon, is provided in the cavity 104 which is sealed to keep the gas in place. The provisioning of the gas and the sealing of the cavity 104 are done in accordance with practices known to those of ordinary skill in the art.

Referring now to FIG. 2B, in operation, a high DC voltage source 220 is coupled to the anode 202 and the cathode 204. The voltage level of the DC voltage source 220 depends on the gas is used in the cavity 104. For Neon and Argon, the voltage is in the range of 10-20 volts, however, Nitrogen requires around 300 volts. The voltage requirement increases as the distance from the anode to either the cathode or ground, as discussed below, increases. There are advantages to using a gas, therefore, that has a lower ionization voltage. When turned on, the gas in the cavity 104 is ionized by the high DC voltage source 220 to create an ion cloud 222 at the sharp anode tip 203. An electric field created between the anode 202 and the cathode 204 drives the ion cloud 222 towards the cathode 204 thereby forming an ion jet stream 224.

The heater 206 is placed in the path of the ion jet stream 224, so as to heat the ion jet stream 224 before it reaches the temperature sensing positive and negative thermocouples 208, 210. The heater 206 is heated by passing current through its structure and, in one embodiment, is heated to about 100° K above ambient temperature. It should be noted that the heater 206 is positioned so as to heat the ion jet stream 224 without blocking the ion jet stream 224 from reaching the thermocouples 208, 210. A respective temperature of the ion jet stream 224 impinging on each of the thermocouples 208, 210 is represented by the sensed values TCP1, TCM1.

The heater 206 is fabricated using standard CMOS layers, such as Polysilicon or metal. A release etch will remove silicon underneath the heater 206 and the release etch can be the same process step that is used to make the cavity 104. The suspended structure of the heater 206, discharge tip 203 and thermocouples 207 are thin in nature, generally a few microns (μm). The heater 206 will not block the ion jet stream 224 flow in the lateral direction.

At rest, i.e., when the device 200 is neither spinning nor linearly moving, the positive and negative thermocouples 208, 210 should sense a same temperature. Thus, a difference between their respective signals TCP1, TCM1 is zero as the ion jet stream 224 is traveling in a straight direction, in this case, along the X axis, and impinging equally on the thermocouples. Thus, the output signal ROTATIONØ, shown in FIG. 4, would be zero.

In a situation where the device 200 is rotating, as shown in FIG. 2C, i.e., rotating about the Z axis which, in FIG. 2C, is coming up out of the drawing, the ion jet stream 224 will be skewed toward either the positive thermocouple 208 or the negative thermocouple 210. As a result, there will be a temperature difference between the positive and negative thermocouples 208, 210 resulting in a difference between the respective output signals TCP1, TCM1 and the value ROTATIONØ will be greater or less than zero, depending upon the direction of spin.

The gyroscope 200 shown in FIGS. 2A-2C, however, is subject to interference in the output signal ROTATIONØ due to linear acceleration. That is, when the device 200 is accelerating along a direction that is, for example, perpendicular to the gas stream direction, the ion jet stream 224 will be skewed in the opposite direction. Such a skewing, however, will create an error in the reading that will be difficult to distinguish from the effects of rotation.

A symmetric ion gyroscope 300, as shown in FIGS. 3A-3D, provides compensation for linear acceleration.

Figure 3A:
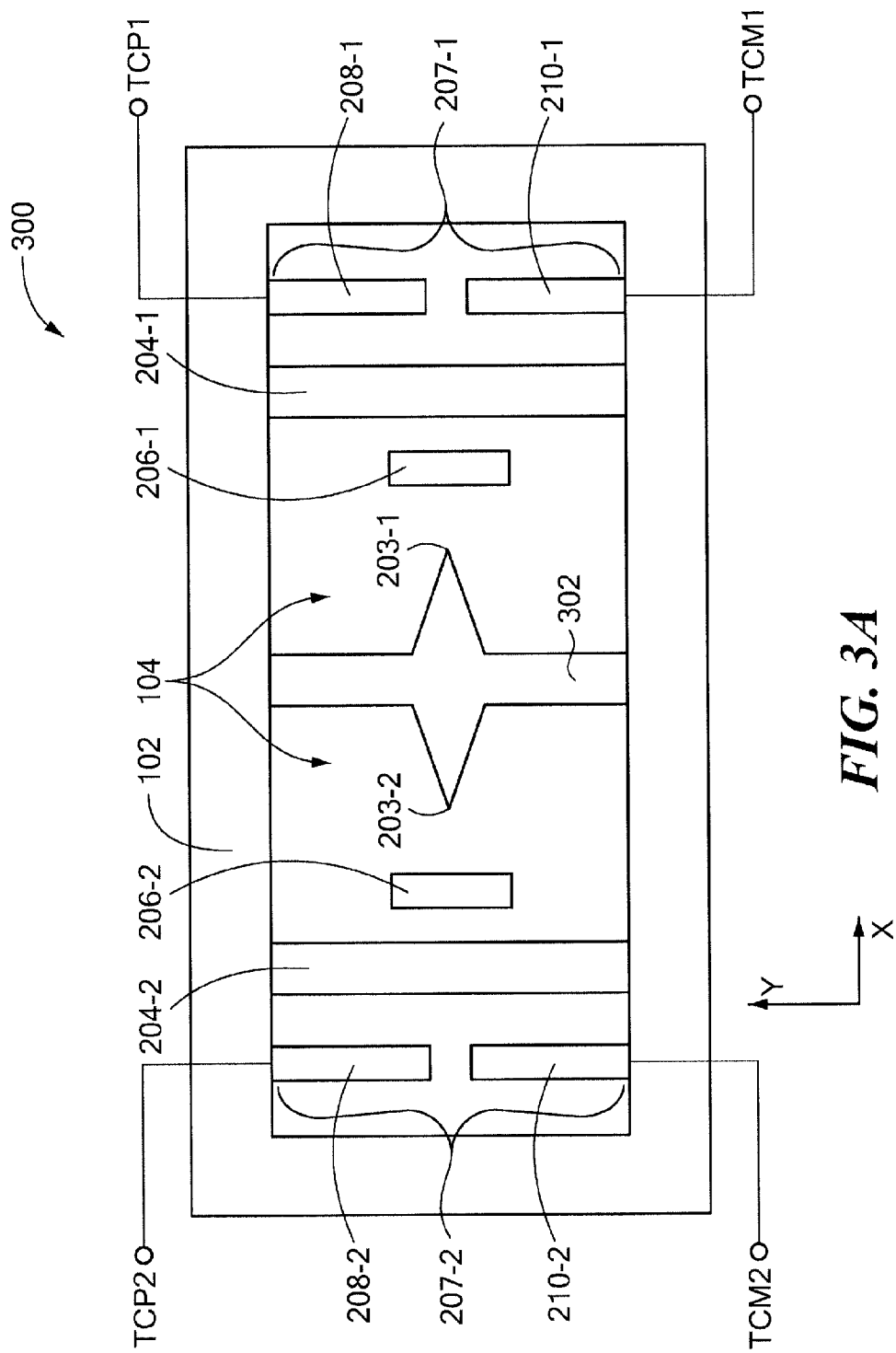
FIGS. 3A-3D are schematic representations of an ion gyroscope according to a second embodiment of the present invention.

Referring now to FIG. 3A, the symmetric gyroscope 300 comprises a substrate 102 with a cavity 104 similar to the embodiment described above. A symmetric anode 302 is positioned in the cavity 104 and includes sharp tips 203-1, 203-2 disposed on each side of the symmetric anode 302. First and second cathodes 204-1, 204-2 are disposed within the cavity 104 along with first and second heaters 206-1, 206-2 positioned between the symmetric anode 302 and the first and second cathodes 204-1, 204-2, respectively. A first pair 207-1 of positive and negative thermocouples 208-1, 210-1 that provide outputs TCP1 and TCM1 along with a second pair 207-2 of positive and negative thermocouples 208-2, 210-2 that provide signals TCP2, TCM1 are disposed in the cavity 104. One of ordinary skill in the art will understand that the symmetric gyroscope 300 represents "mirror image" versions of the gyroscope 200 described above.

Referring now to FIG. 4, a measurement circuit 400 consists of first and second differential amplifiers 402-1, 402-2, that receive, respectively, (TCP1, TCM1) and (TCP2, TCM2) the outputs of which are respectively coupled to the non-inverting and inverting inputs of a third differential amplifier 402-3 to output a difference therebetween as a ROTATION1 signal. In addition, the respective outputs of the first and second differential amplifiers 402-1, 402-2 are input to a summer circuit 404 that adds the signals together to provide an indication of linear acceleration.

Figure 3B:
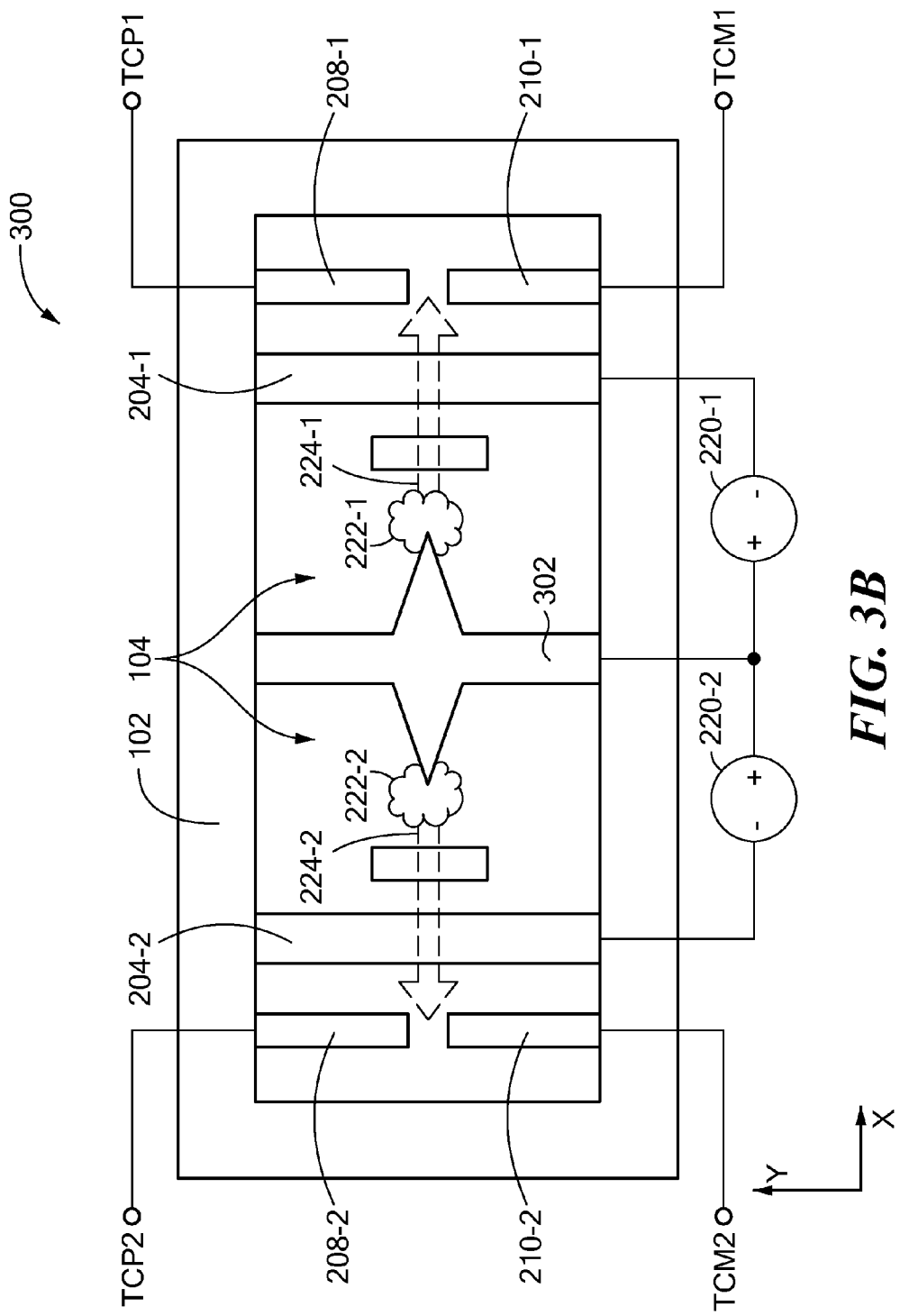

In operation, referring now to FIG. 3B, first and second high DC voltage power sources 220-1, 220-2, are coupled to the symmetric anode 302 and the first and second cathodes 204-1, 204-2, respectively.

When the first and second voltage sources 220-1, 220-2, and the heaters 206-1, 206-2, are turned on, and the symmetric gyroscope 300, is at rest, the ion jet streams 224-1, 224-2 resulting from the ion clouds 222-1, 222-2, respectively, strike the pairs 207-1, 207-2 of positive and negative thermocouples 208-1, 208-2, 210-1, 210-2 equally and the differences between all outputs TCP1, TCM1, and TCP2, TCM2 are zero.

Figure 3C:
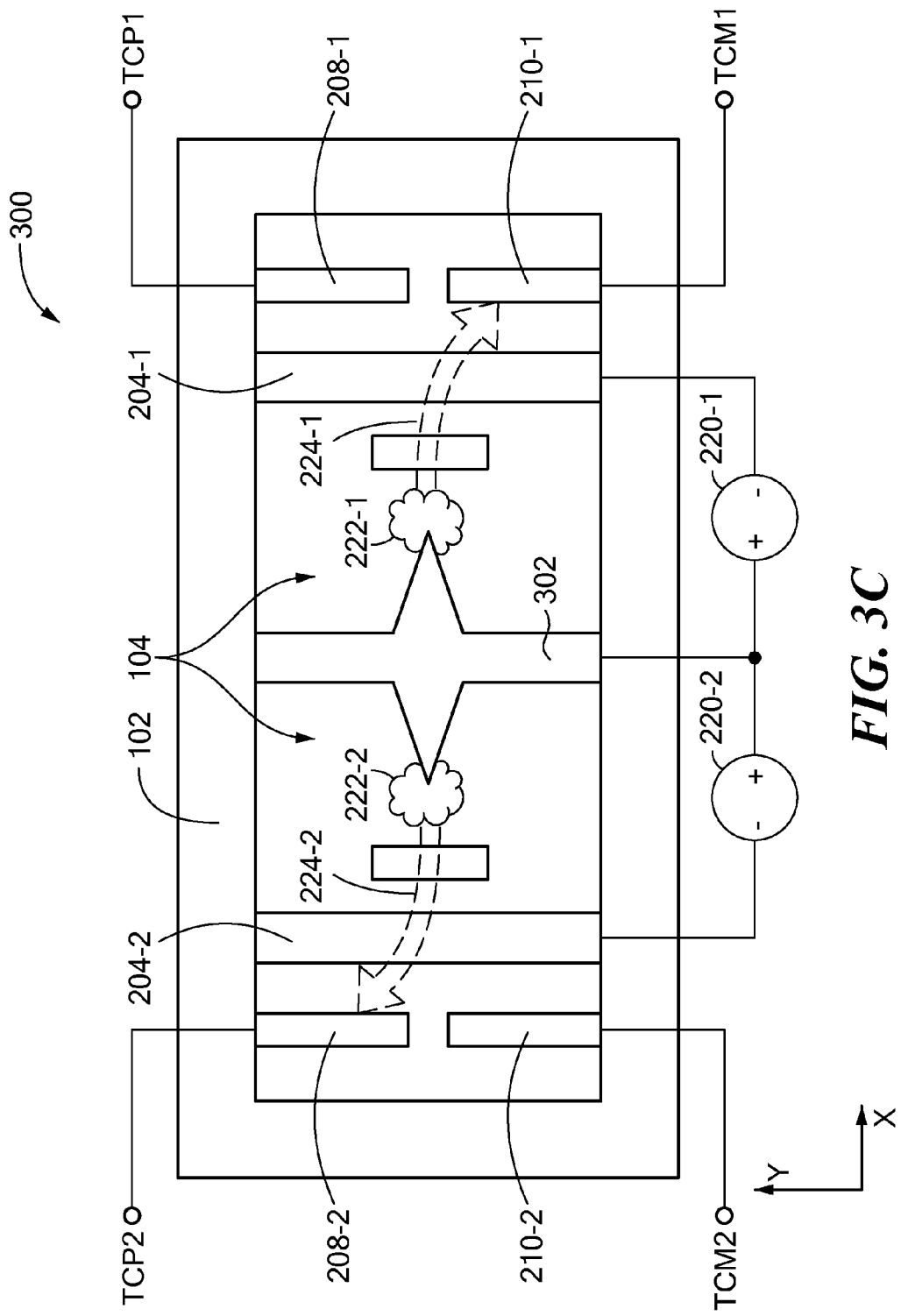

When the symmetric gyroscope 300 is rotated, as shown in FIG. 3C, the first and second ion jet streams 224-1, 224-2 will be deflected in opposite directions. Accordingly, there will be a difference between the first and second pairs of thermocouples 207-1, 207-2 output signals TCP1, TCM1 and TCP2, TCM2. Such a difference, as will be calculated as described below, can be used to identify an amount of rotational motion.

Figure 3D:
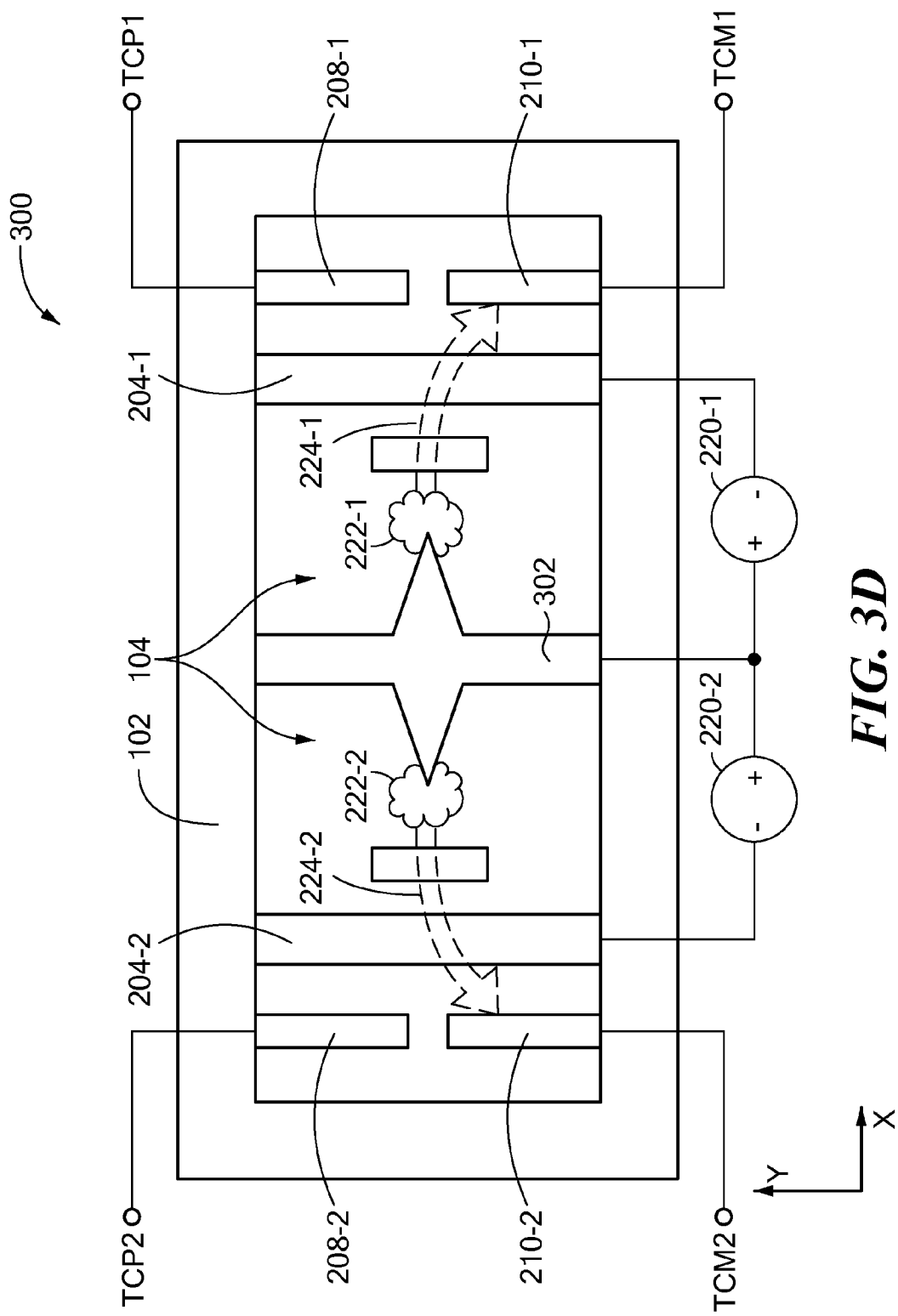

As show in FIG. 3D, when the symmetric gyroscope 300 is linearly accelerated in, for example, the Y direction, the first and second jet streams 224-1, 224-2 will be deflected in the opposite direction. An imbalance in the temperature sensed as between the pairs of positive and negative thermocouples 207-1, 207-2 will indicate an amount of linear acceleration.

Thus, when the symmetric gyroscope 300 is rotating, the signals from the first and second pairs 207-1, 207-2 of positive and negative thermocouples will have opposite polarities. The ROTATION1 signal output from the differential amplifier 402-3 will indicate a magnitude of rotation in addition to a direction.

The amount of linear acceleration is provided by the summer 404 which sums, i.e., averages, the differences between the pairs 207-1, 207-2, of positive and negative thermocouples 208, 210, while also indicating a direction of acceleration.

Figure 5A:
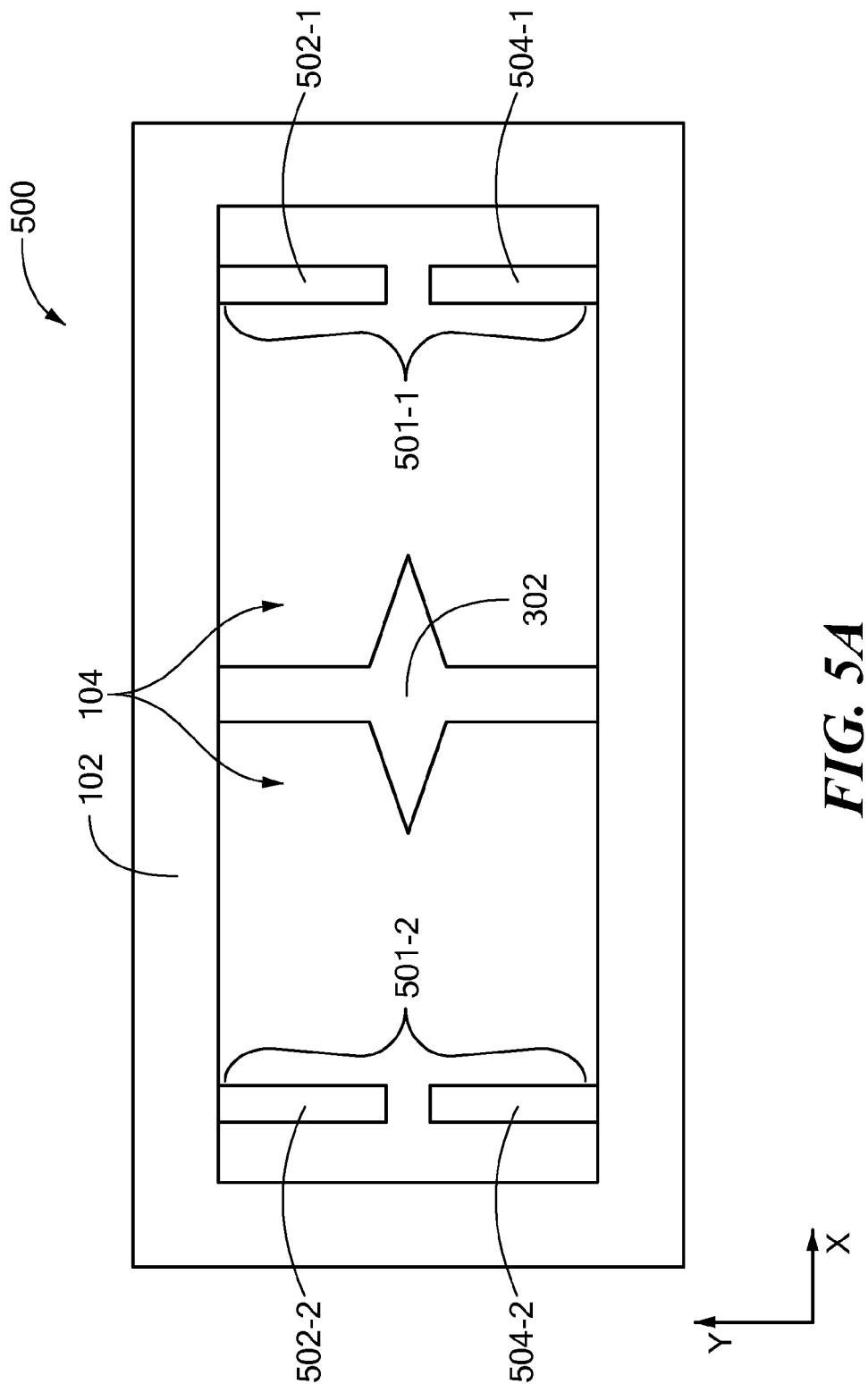
FIGS. 5A-5D are schematic representations of an ion gyroscope according to a third embodiment of the present invention.

In a third embodiment of the present invention, an ion gyroscope 500, as shown in FIGS. 5A-5D, uses current mode sensing rather than thermo sensing. Accordingly, as shown in FIG. 5A, the current mode gyroscope 500 includes a substrate 102 with a cavity 104 as described above. In addition, a symmetric anode 302 is positioned within the cavity 104. A first ground electrode 501-1 is provided within the cavity 104 and consists of a first upper portion 502-1 and a first lower portion 504-1. A second ground electrode 501-2 is split into respective upper and lower portions 502-2, 504-2, respectively. One will understand that these ground electrodes can also be considered as being cathodes.

Figure 5B:
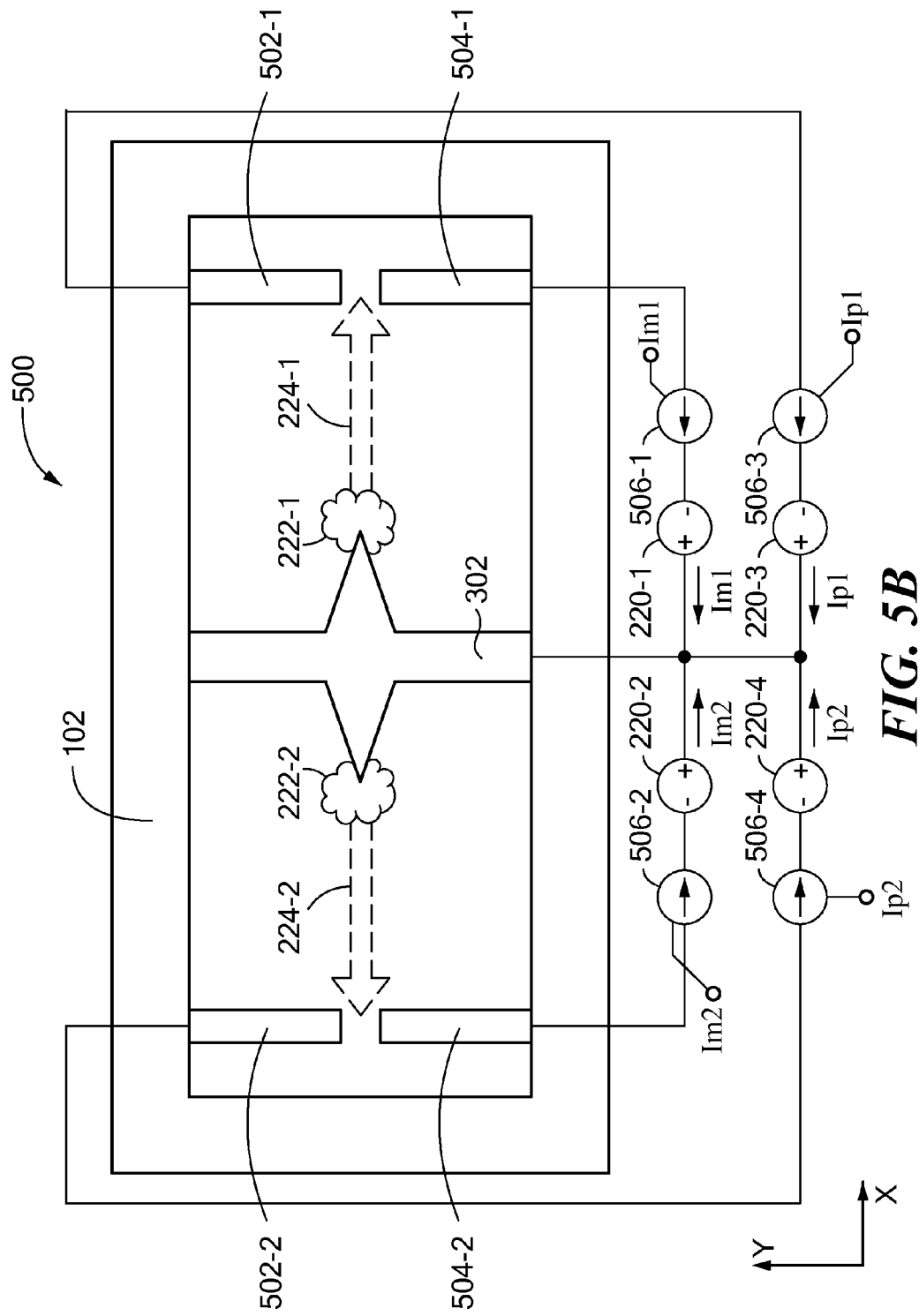

As shown in FIG. 5B, a first DC voltage sources 220-1 and a first current meter 506-1 are coupled between the anode 302 and the first lower portion 504-1. The first current meter 506-1 provides a signal Im1 indicating the amount of current flowing in that leg of the circuit. A second DC voltage source 220-2 and a second current meter 506-2 are coupled between the anode 302 and the second lower portion 504-2. The second current meter 506-2 provides a signal Im2 indicating the amount of current flowing in that leg of the circuit. A third DC voltage source 220-3 and a third current meter 506-3 are coupled between the anode 302 and the first upper portion 502-1 of the first ground electrode. The third current meter 506-3 provides a signal Ip1 indicating the amount of current flowing in that leg of the circuit. A fourth DC voltage source 220-4 and a fourth current meter 506-4 are coupled between the anode 302 and the second upper portion 502-2 of the second ground electrode 502-2. The fourth current meter 506-4 provides a signal Ip2 indicating the amount of current flowing in that leg of the circuit.

Similar to the first and second embodiments, when the power supplies are turned on, an ion cloud and ion jet stream will be formed and will flow from the anode toward the ground electrodes. As the ion jet streams 224-1, 224-2 actually carry current, in the case of zero deflection, i.e., at a standstill, the currents will be equally split between the upper and lower ground electrodes in each of the first and second pairs 501-1, 501-2 and reflected in the current measurements Ip1, Im1 and Ip2, Im2. In the presence of deflection, either due to linear acceleration or rotation, the current will not be equal. The indication of motion and its magnitude will be reflected in the output signals.

Figure 6:
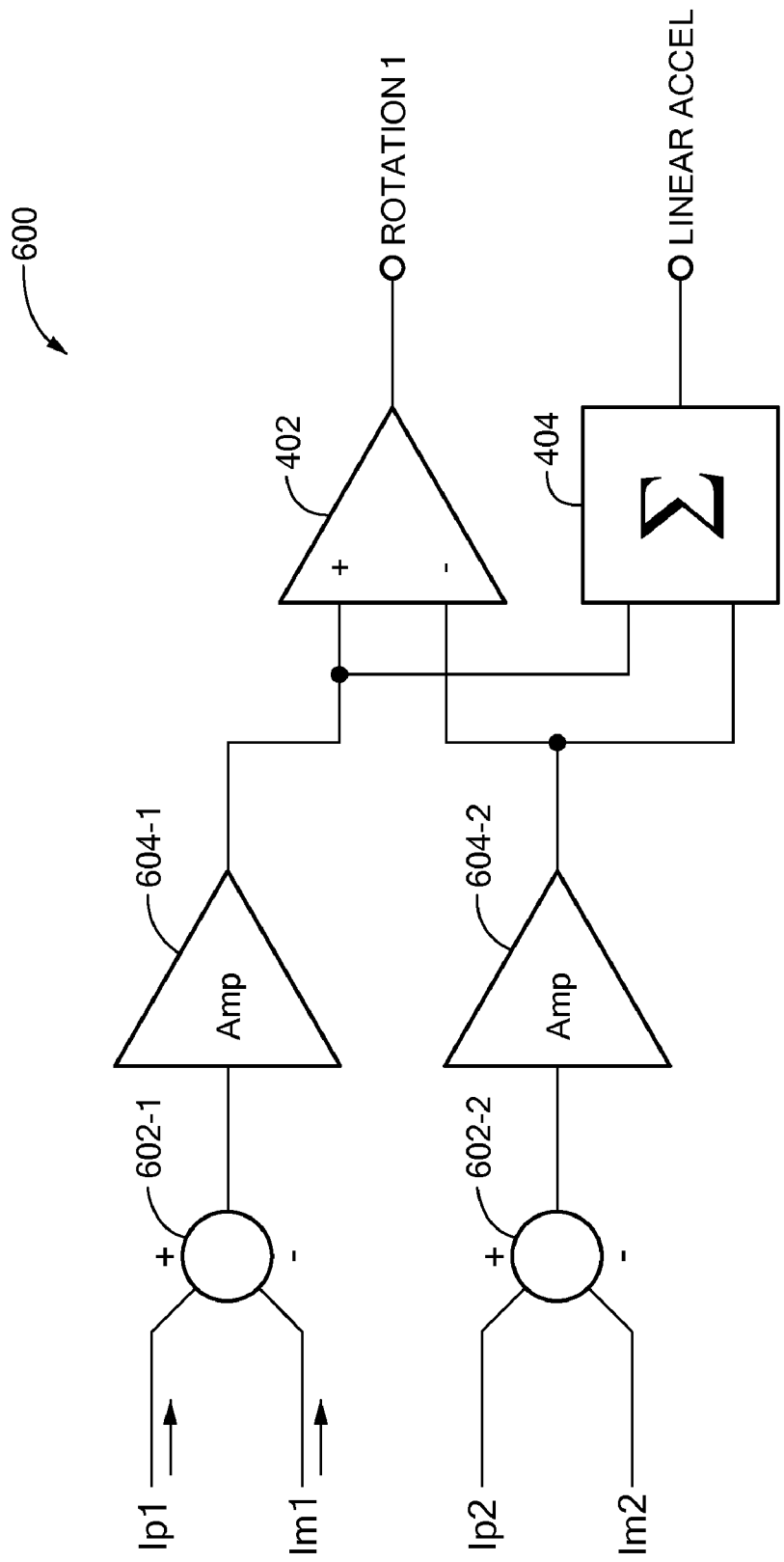
FIG. 6 is a measurement circuit for use in conjunction with the third embodiment of the present invention.

A measurement circuit 600, as shown in FIG. 6, determines the amount of rotation or linear acceleration and includes first and second current difference devices 602-1, 602-2. The first current difference device 602-1 receives the current measurement signals Im1, Ip1 from the first and third current meters 506-1, 506-3, respectively, and the second current difference device 602-2 receives the current measurements Im2 and Ip2 from the second and fourth current meters 506-2, 506-4. The outputs of the current difference devices 602-1, 602-2 are amplified, respectively, by amplifiers 604-1, 604-2.

A differential amplifier 402 receives, at its inputs, the respective outputs from the amplifiers 604-1, 604-2 and provides a ROTATION1 signal indicative of a direction and magnitude of rotation.

A summer 404 adds the outputs of the first and second amplifiers 604-1, 604-2 to arrive at a linear acceleration signal LINEARACCEL indicating the direction and magnitude of linear acceleration, in the example shown in FIGS. 5A-5D, along the Y axis.

Figure 5C:
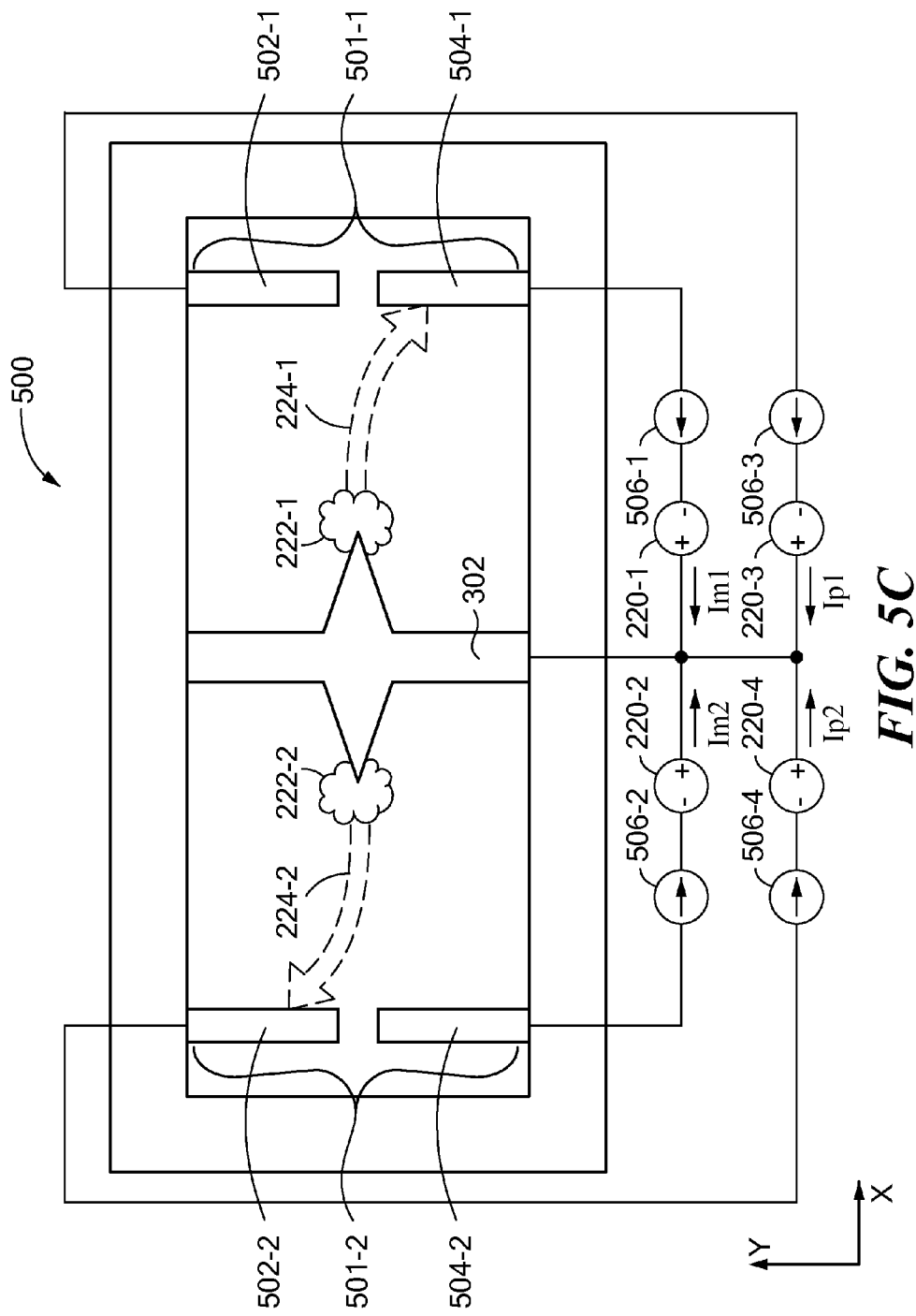
Figure 5D:
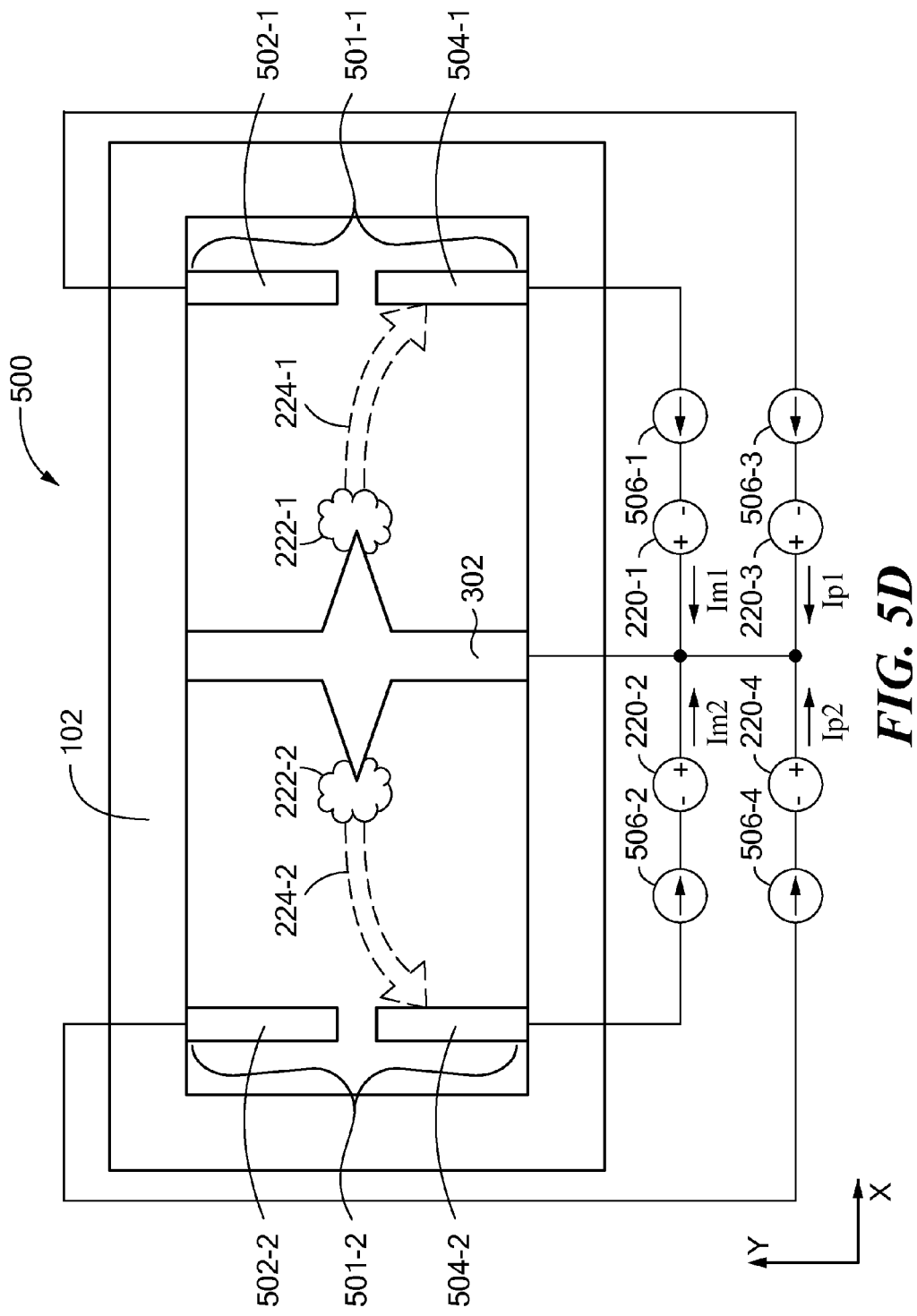

Referring to FIGS. 5C and 5D, when the current mode gyroscope 500 is spinning, or linearly accelerating, respectively, the jet streams 224-1, 224-2 will be deflected, as has been described above.

Advantageously, the current mode sensing gyroscope 500 is a relatively simple device as compared to the prior embodiments described above. It not only removes some structure, for example, the heaters, it also removes the need for the power that would drive the heaters.

Figure 7:
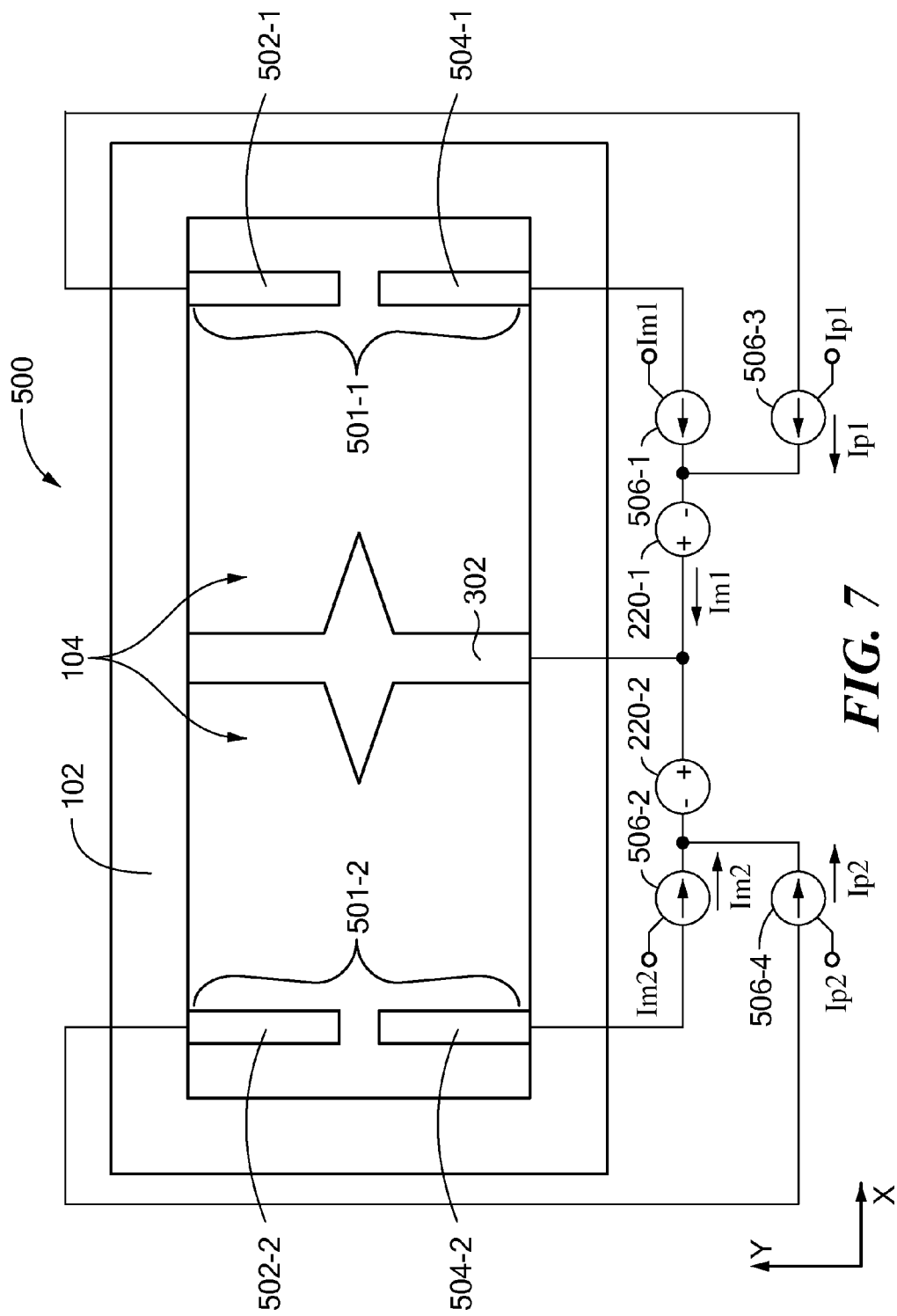
FIG. 7 is an alternate version of the third embodiment of the present invention.

The above-described embodiments of the present invention may be modified in various ways. Referring now to FIG. 7, the current mode gyroscope 500 described in FIGS. 5A-5D may be configured such that one DC voltage supply 220-1, 220-2 is used, respectively, for the two sides of the device and the current sensing devices 506 then measure the currents found on respective "legs" of the circuits as shown.

Figure 8:
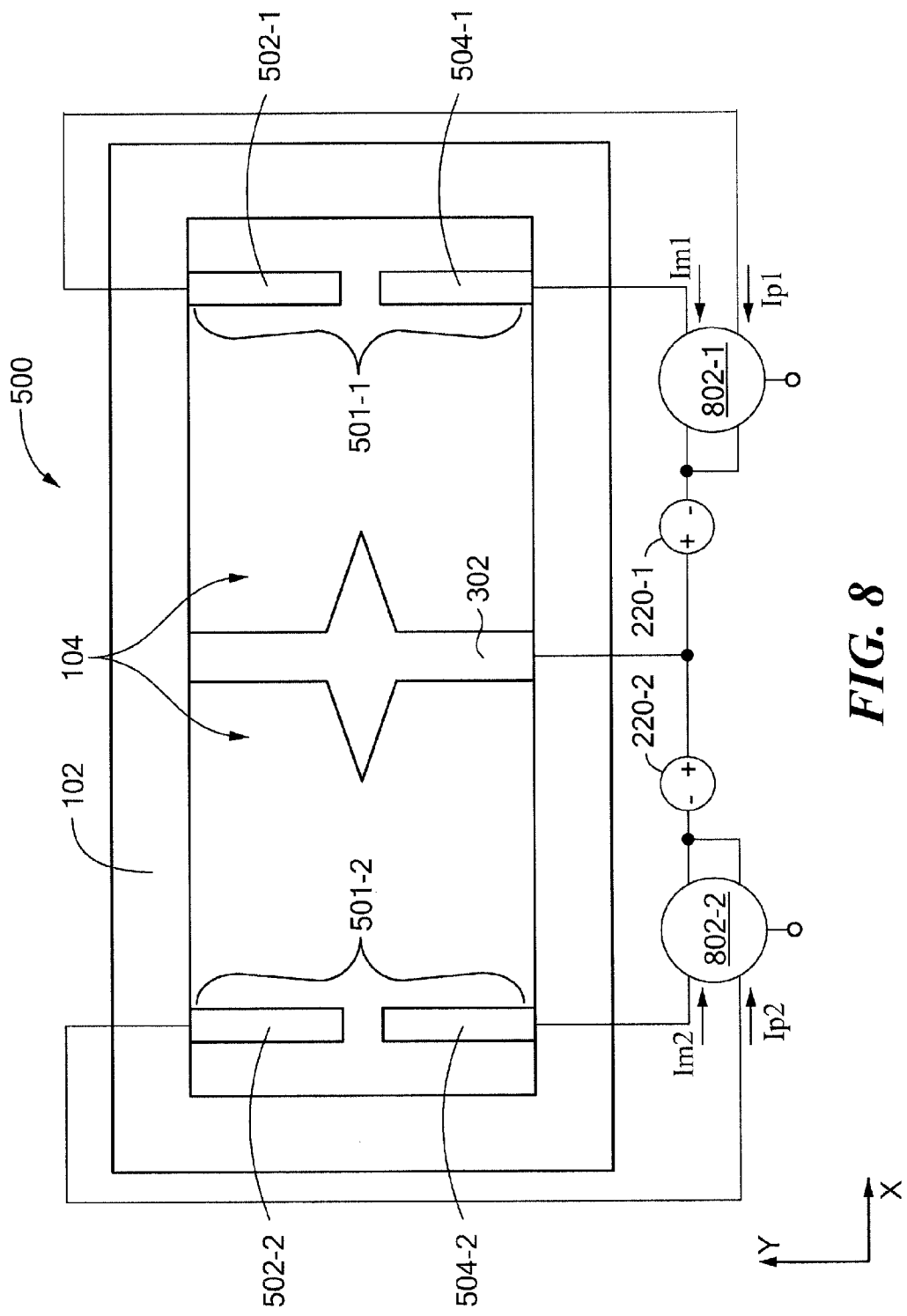
FIG. 8 is another alternate version of the third embodiment of the present invention.

Further, the circuit configuration shown in FIG. 7 may be modified, referring now to FIG. 8, such that a first current difference device 802-1 is used to measure the currents Im1, Ip1 and calculate a difference value therebetween and a second current difference device 802-2 provides the difference value between Im2 and Ip2. This would reduce the number of discrete components necessary to support the current mode gyroscope 500. One of ordinary skill in the art will understand that there are combinations of these alternate devices that may be used.

It should be appreciated that the circuit diagrams shown in the figures also represent some functional blocks and should not be used to limit the claims to any specific structure unless explicitly recited in a claim. Thus, while an inline current meter is shown above, any one of a number of other known current measuring devices may be used including, but not limited to, Hall effect sensors, magnetoresistive sensors, current clamps and current transformers.

Figure 9:
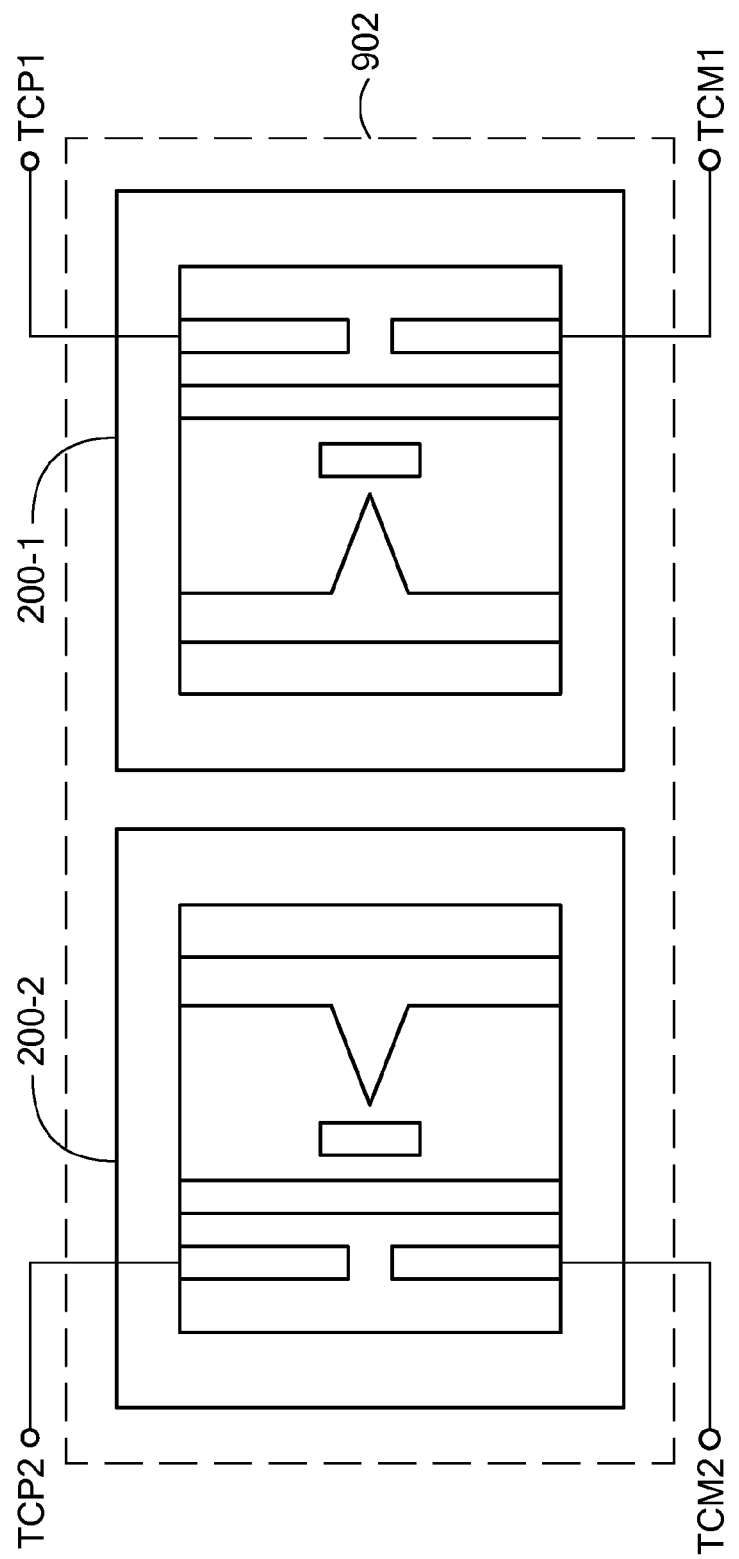
FIG. 9 is an alternate implementation of the first embodiment of the present invention.

In another implementation, as shown in FIG. 9, two of the ion gyroscopes 200-1, 200-2 may be oriented in opposition to one another. Essentially, as shown in FIG. 9, two of these devices may be used to function as the symmetric gyroscope shown in FIGS. 3A-3D. Of course, one of ordinary skill in the art would understand that the necessary DC power sources and output circuitry would need to be connected although not shown in FIG. 9 in order to facilitate explanation. Still further, one of ordinary skill in the art would understand that the two devices 200-1, 200-2 would have to be fixedly oriented, i.e., permanently mounted on a structure 902, with respect to each other such that the linearity of the system is maintained. Accordingly, it may be necessary to calibrate or establish a zero point prior to operation. It is expected, however, that one of ordinary skill in the art would understand how to accomplish this.

Figure 10:
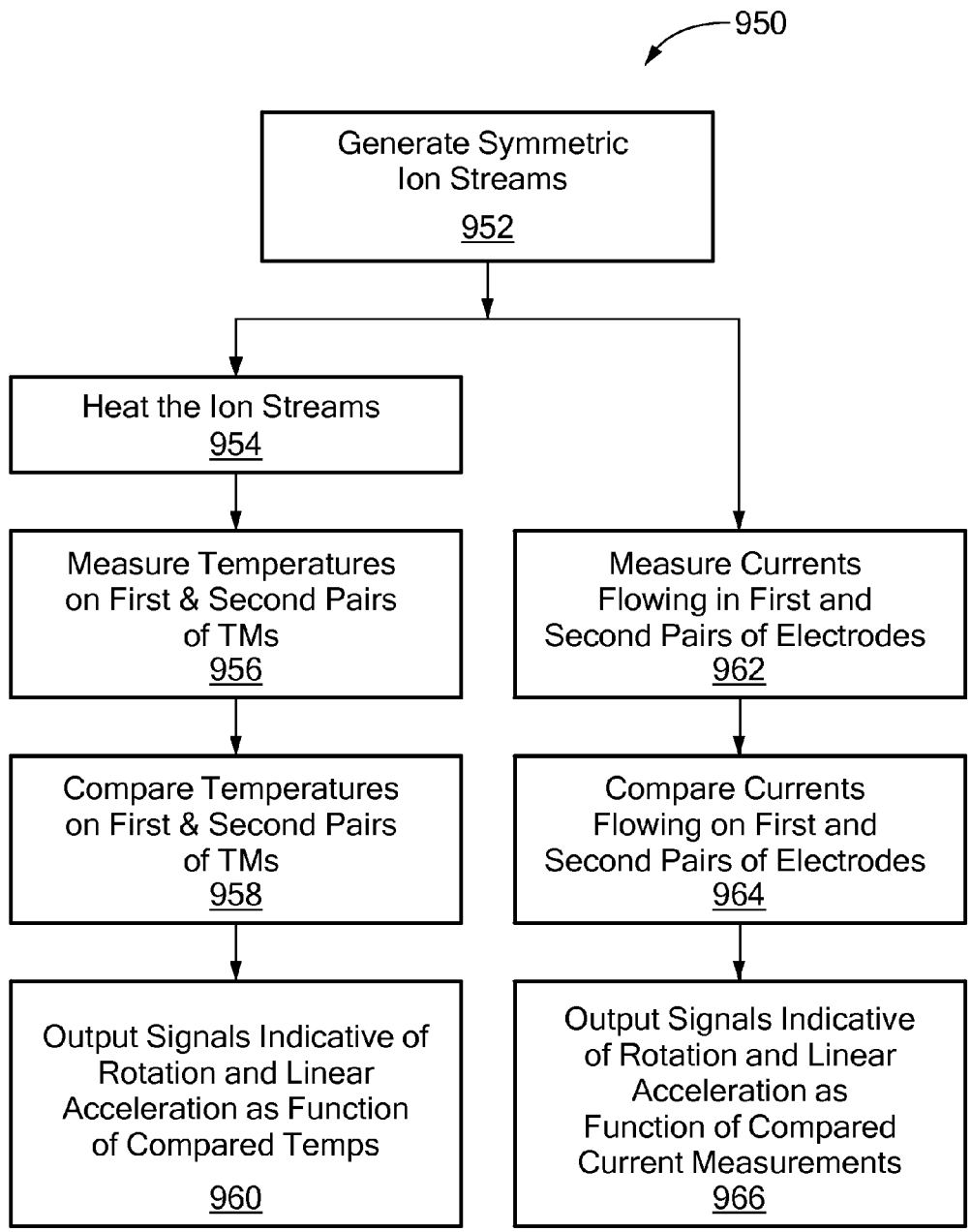
FIG. 10 is a flowchart of methods in accordance with embodiments of the present invention.

Referring now to FIG. 10, a flowchart 950 represents methods in accordance with embodiments of the present invention as described herein. Initially, step 952, symmetric ion streams are generated. Subsequently, if implementing the heated ion gyroscope, control passes to step 954 where the ion streams are heated. The temperatures are measured on the first and second pairs of thermocouples, step 956, and those temperatures on the first and second pairs of thermocouples are compared to one another, step 958. Output signals indicative of rotation and/or linear acceleration as functions of the compared temperatures are then provided, step 960.

If the current mode gyroscope is implemented then, step 962, the currents flowing in the first and second pairs of electrodes are measured. These currents are then compared to one another, step 964, and subsequently output signals indicative of rotation and linear acceleration are provided as a function of the compared current measurements, step 966.

Further, the discrete devices in the measurement circuits 400, 600 may be replaced by analog devices, digital devices, hybrid devices, and devices under the control of a microprocessor, e.g., Analog-Digital converters and Digital-Analog converters. These would all be understood by one of ordinary skill in the art.

Still further, the gyroscope, DC voltage sources, current meters, measurement circuits, etc. may all be combined in a single device having only a power input and output signals to offer a "system on a chip" operability.

Having thus described several features of at least one embodiment of the present invention, it is to be appreciated that various other alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of measuring movement of a device, the method comprising:
   generating, from an ion source, a first ion stream driven in a first direction along an imaginary line;
   generating, from the ion source, a second ion stream driven in a second direction along the imaginary line and substantially opposite the first direction;
   detecting first and second amounts of the first ion stream impinging, respectively, on each detector in a first pair of detectors;
   detecting third and fourth amounts of the second ion stream impinging, respectively, on each detector in a second pair of detectors; and
   generating at least one of a first output signal representing rotation of the device and a second output signal representing linear acceleration of the device, each as a function of the detected first, second, third and fourth impinging amounts of the first and second ion streams,
   wherein each of the first and second pairs of detectors is fixedly spaced apart from the ion source.

2. The method of claim 1, wherein detecting the amounts of the ion stream impinging on the detectors comprises:
   measuring a respective amount of current, due to the first and second ion streams, flowing in each detector.

3. The method of claim 1, further comprising:
   measuring first and second currents flowing, respectively, through the detectors in the first pair of detectors;
   measuring third and fourth currents flowing, respectively, through the detectors in the second pair of detectors; and
   generating the first and second output signals as a function of the measured currents.

4. The method of claim 1, further comprising:
   heating the first ion stream at a first location between the ion source and the first pair of detectors;
   heating the second ion stream at a second location between the ion stream and the second pair of detectors;
   measuring a respective temperature of each detector in the first pair of detectors;
   measuring a respective temperature of each detector in the second pair of detectors; and
   generating the first and second output signals as a function of the measured temperature of each detector.

5. The method of claim 4, wherein each of the detectors comprises a thermocouple.

6. The method of claim 1, wherein generating the first output signal representing the rotation comprises:
   determining a first difference value between the first and second amounts of the first ion stream impinging on each of the detectors of the first pair of detectors;
   determining a second difference value between the third and fourth amounts of the second ion stream impinging on each of the detectors of the second pair of detectors; and
   generating the first output signal as a difference between the first and second difference values.

7. The method of claim 6, wherein generating the second output signal representing the linear acceleration comprises:
   adding the first and second difference values together.

8. An ion gyroscope, comprising:
   a substrate having a cavity defined therein, the cavity having a longitudinal axis L;
   an anode located in the cavity, the anode having a first surface facing in a first direction and a second surface facing in a second direction opposite the first direction;
   at least one anode tip located on the first surface of the anode;
   at least one anode tip located on the second surface of the anode;
   a first cathode located in the cavity opposite the first surface of the anode such that an imaginary line from the first surface of the anode to the first cathode runs in a first direction substantially parallel to the longitudinal axis L;
   a second cathode located in the cavity opposite the second surface of the anode such that an imaginary line from the second surface of the anode to the second cathode runs in a second direction opposite the first direction and substantially parallel to the longitudinal axis L;
   a first pair of detectors disposed in the cavity, such that the first cathode is between the first pair of detectors and the first surface of the anode, and the detectors in the first pair are linearly arranged with one another substantially perpendicular to the longitudinal axis L; and
   a second pair of detectors disposed in the cavity, such that the second cathode is between the second pair of detectors and the second surface of the anode, and the detectors in the second pair are linearly arranged with one another substantially perpendicular to the longitudinal axis L,
   wherein each of the first and second pairs of detectors is fixedly spaced apart from the anode.

9. The ion gyroscope of claim 8, further comprising:
   a first DC voltage source coupled between the anode and the first cathode and configured to generate and drive a first ion stream in a first direction along an imaginary line from the anode to the first cathode; and
   a second DC voltage source coupled between the anode and the second cathode and configured to generate and drive a second ion stream in a second direction substantially opposite the first direction along the imaginary line from the anode to the second cathode.

10. The ion gyroscope of claim 8, further comprising:
a first DC voltage source and a first current meter coupled in series between the anode and a first detector of the first pair of detectors;
a second DC voltage source and a second current meter coupled in series between the anode and a first detector of the second pair of detectors;
a third DC voltage source and a third current meter coupled in series between the anode and the second detector of the first pair of detectors; and
a fourth DC voltage source and a fourth current meter coupled in series between the anode and second detector of the second pair of detectors,
wherein each of the first and second pairs of detectors are at a ground potential with respect to the DC voltage sources, and
wherein each of the DC voltage sources is configured to generate an ion stream from the anode to the respective detector.

11. The ion gyroscope of claim 8, further comprising:
a first heating element disposed in the cavity and positioned between the first surface of the anode and the first cathode; and
a second heating element disposed in the cavity and positioned between the second surface of the anode and the second cathode.

12. The ion gyroscope of claim 11, wherein each of the detectors comprises a thermocouple.

13. The ion gyroscope of claim 8, further comprising:
a DC voltage source coupled between the anode and each detector of the first and second pairs of detectors,
wherein the DC voltage source is configured to generate and drive a first ion stream from the anode to the first pair of detectors and a second ion stream from the anode to the second pair of detectors.

14. The ion gyroscope of claim 13, further comprising:
means for measuring a respective current flowing through each detector.

15. An ion gyroscope, comprising:
a substrate having a cavity defined therein, the cavity having a longitudinal axis L;
an anode located in the cavity, the anode having first and second surfaces facing in opposite first and second directions, respectively;
at least one anode tip located on the first surface of the anode;
at least one anode tip located on the second surface of the anode;
a first cathode located in the cavity opposite the first surface of the anode such that an imaginary line from the first surface of the anode to the first cathode runs in a first direction, substantially parallel to the longitudinal axis L;
a second cathode located in the cavity opposite the second surface of the anode such that an imaginary line from the second surface of the anode to the second cathode runs in a second direction opposite the first direction and substantially parallel to the longitudinal axis L;
a first pair of detectors disposed in the cavity and the detectors in the first pair are linearly arranged substantially perpendicular to the longitudinal axis L and on another side of the first cathode from the anode;
a second pair of detectors disposed in the cavity and the detectors in the second pair are linearly arranged substantially perpendicular to the longitudinal axis L and on another side of the second cathode from the anode;
a first heating element disposed in the cavity and positioned between the first surface of the anode and the first cathode; and
a second heating element disposed in the cavity and positioned between the second surface of the anode and the second cathode,
wherein each detector comprises a thermocouple.

16. The ion gyroscope of claim 15, further comprising:
a first DC voltage source coupled between the anode and the first cathode and configured to generate a first ion stream from the anode to the first cathode; and
a second DC voltage source coupled between the anode and the second cathode and configured to generate a second ion stream from the anode to the second cathode.

17. The ion gyroscope of claim 15, further comprising:
a DC voltage source coupled to the anode and the first and second cathodes, the DC voltage source configured to generate a first ion stream from the anode to the first cathode and a second ion stream from the anode to the second cathode.

18. An ion gyroscope, comprising:
a substrate having a cavity defined therein, the cavity having a longitudinal axis L;
an anode located in the cavity, the anode having first and second surfaces facing in opposite first and second directions, respectively;
at least one anode tip located on the first surface of the anode;
at least one anode tip located on the second surface of the anode;
a first pair of detectors disposed in the cavity opposite the first surface of the anode and linearly arranged substantially perpendicular to the longitudinal axis L;
a second pair of detectors disposed in the cavity opposite the second surface of the anode and linearly arranged substantially perpendicular to the longitudinal axis L;
means for generating and driving first and second ion jet streams from, respectively, the anode tips on the first and second surfaces of the anode towards the first and second pairs of detectors, respectively, wherein the first ion stream is driven in a first direction along an imaginary line and the second ion stream is driven in a second direction along the imaginary line and substantially opposite the first direction; and
means for measuring a respective amount of current flowing through each detector due to the first and second ion jet streams,
wherein each of the first and second pairs of detectors is fixedly spaced apart from the anode.

19. The ion gyroscope of claim 18, wherein the ion jet streams generating means comprises:
a first DC source coupled between the anode and the first pair of detectors and configured to generate a first ion stream therebetween; and
a second DC source coupled between the anode and the second pair of detectors and configured to generate a second ion stream therebetween.

20. The ion gyroscope of claim 18, wherein the first and second pairs of detectors are at a same potential.

21. The ion gyroscope of claim 18, further comprising:
means for measuring a respective current flowing through each detector in the first and second pairs of detectors.

* * * * *